3,215,292
MATERIAL HANDLING APPARATUS—FRONT
LIFT TYPE
Lawrence M. Halls, New Holland, Pa., assignor to Sperry Rand Corporation, New Holland, Pa., a corporation of Delaware
Filed Sept. 14, 1964, Ser. No. 395,994
20 Claims. (Cl. 214—140)

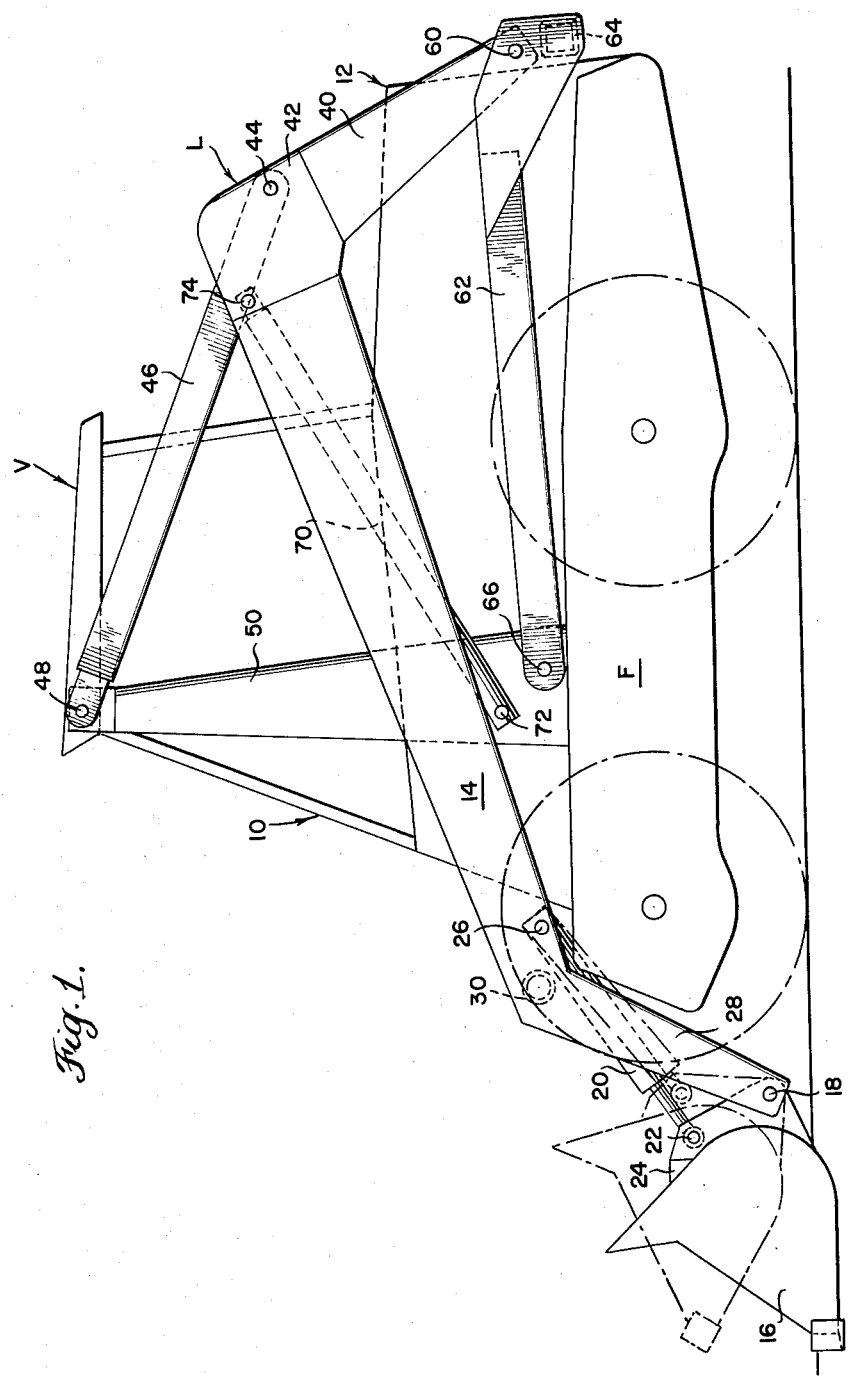

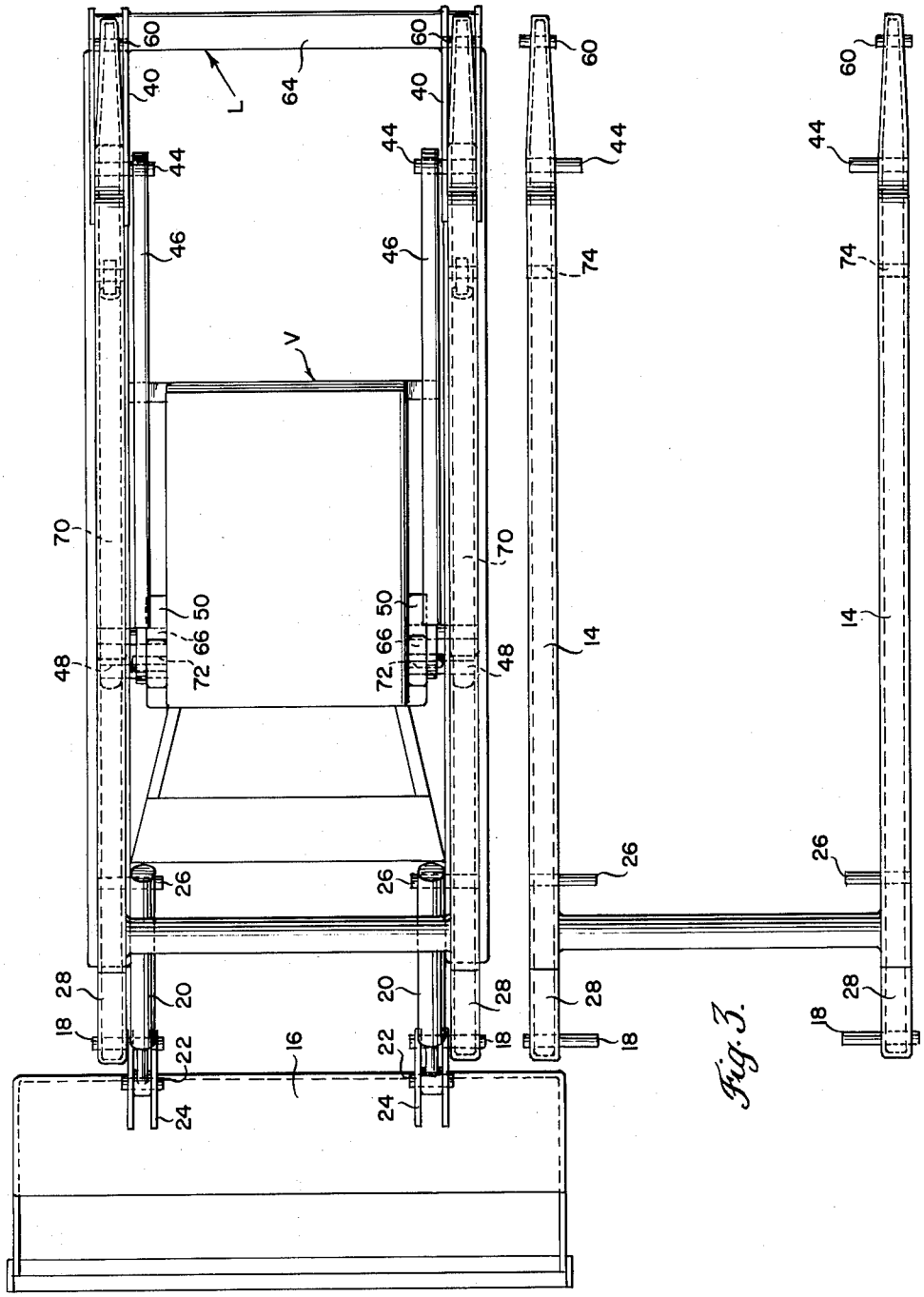

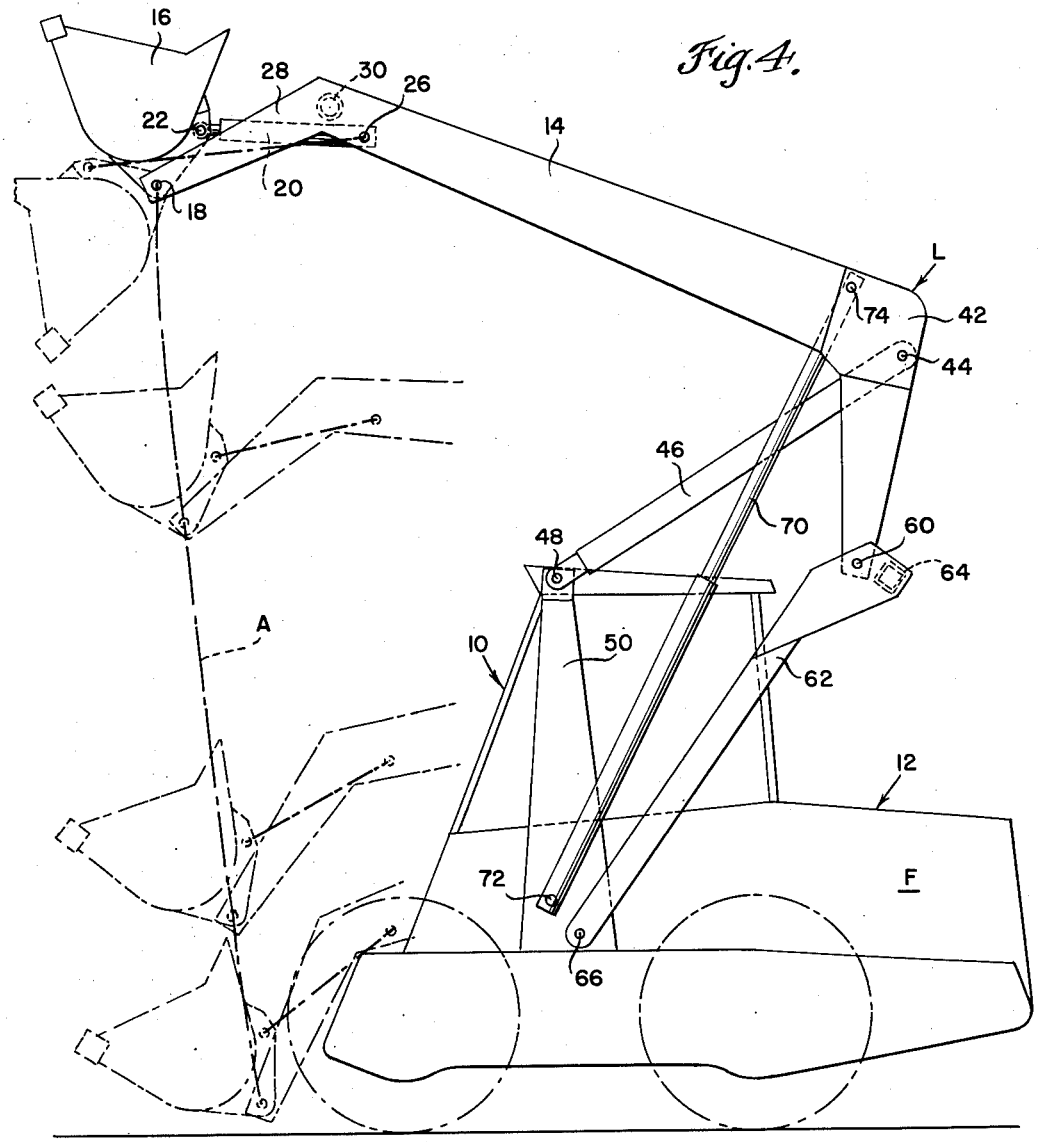

This invention relates to improvements in material load handling apparatus and attachments for use on tractor type vehicles and the like and specifically to front end loaders.

In the past, various devices have been devised to maintain as near as possible the center of gravity on the vehicle during load maneuvering operations. Counterbalancing weights and the like have been used for heavy loads. The tendency of the tractor to tilt forward on its front axle during loading operation has necessitated requirements for moving the main load arms down as close as possible to the ground in order to keep the center of gravity low under loading conditions.

This invention specifically involves a loader arrangement which consists of lift arms journalled to a pair of links so located and dimensioned that the resultant motion of the loaded end of the arms raise along a nearly vertical path instead of an arcuate path of the conventional loader.

An object of this invention is to reduce the shifting of gravity of the unit forward as the load is raised.

Still a further object of this invention is to provide a higher lifting height than a conventional pivoting arm loader.

Another object of this invention is to reduce the reactionary force that tends to vault the power unit over the scoop while driving ahead to fill it.

Yet a further object of this invention is to provide a lower center of gravity during the loading operation.

Still another object of this invention is to provide a loading attachment for tractors and the like which is simple and inexpensive to manufacture.

Yet a further object of this invention is to provide an attachment for tractors and the like which would require a minimum of alteration of the tractor under installation and simplicity of installation.

A further object of this invention is to provide a high lift material handling implement that is relatively light in weight and efficient in operation.

These and other objects of this invention will be apparent from the following description and claims.

In the accompanying drawings which illustrate by way of example various embodiments of this invention:

FIGURE 1 is a side elevational view with the linkage and bracket in down or scooping position in full lines and with the bucket shown in loading carrying position in dot and dash lines.

FIGURE 2 is a plan view of FIGURE 1.

FIGURE 3 is a detailed plan view of the main load lifting arms.

FIGURE 4 is a side elevational view with the bucket and linkage shown in its uppermost position in full lines; the dot and dash positions starting from the bottom illustrate:

(1) Arms in the same position as FIGURE 1 and the bucket in load carrying position.

(2) Arms raised to a road travel position and bucket in load carrying position.

(3) Arms raised higher with the bucket in load carrying position.

(4) The bucket in the dumping position at the uppermost position.

For the purposes of this invention, the vehicle V shown in the figures comprises a frame F having an upper structure 10 and a lower structure 12. The vehicle V may be a wheeled or Caterpillar type unit such as are conventionally used. The loader apparatus L is so constructed as to be easily adaptable to various types of vehicles with a minimum of modification.

The load apparatus L comprises a pair of loading arms 14 which support at the forward end a material handling bucket 16 or similar type of apparatus such as a bulldozer blade or the like. The bucket 16 is pivotally mounted on the load arms 14 at points 18. The bucket 16 is connected to a pair of hydraulic cylinders 20 or some other suitable power operating means at pivots 22 on brackets 24 extending from the back of the bucket 16. The other end of the hydraulic cylinders 20 pivot about pins 26 on load arms 14. Suitable hydraulic lines (not shown) will be connected to power supply and operating means (not shown) so as to be controlled by the operator of the vehicle V. Since this invention is not directed to the hydraulic system, any suitable system available can be used. Each of the load arms 14 have a downwardly extending member 28. Pivots 18 are journalled at the end of the downwardly extending members 28.

A cross beam support 30 ties the load arms 14 together to provide a rigid truss-like support for the bucket 16.

Each of the load arms 14 has associated therewith a downwardly and rearwardly extending member 40. As illustrated in FIGURE 1, the member 40 is rigidly connected to the load arm 14 by a welded or bolted plate member 42. The downwardly projecting members 40 may be considered to be an integral part of the load arms 14 and thus it can be said that the load arms 14 in their appearance have the shape of a "C." It is possible that load arms 14 with downwardly extending portions 28 and 40 could be one integral and cast member though cost might dictate that the member be formed of several interconnected pieces.

In the vicinity of the juncture of the load arms 14 with the downwardly extending members 40 and generally in the area of the plates 42, pivot pins 44 are located. Pivot pins 44 support links 46 which connect the load arms 14 to the upper support structure 10 at the pivots 48 located on an upright support 50 which comprises a pair of vertical post members mounted on the frame F of the vehicle V.

The downwardly extending members 40 each support a pin 60 which is journalled or pivotally fixed to individual link members 62 on either side of the vehicle V. The links 62 are interconnected by a cross beam or tie rod 64. The forward ends of the links 62 are provided with a pivot 66 which are connected on either side of the lower support structure 12 and as shown in FIGURE 1 at the base of the posts or uprights 50. It is to be noted that the links 46 are shorter than the links 62 in order to provide for proper clearances of the vehicle frame F. Variations in the length of the linkages 46 and 62 may be desired to accommodate differences in the sizes of the vehicles and for purposes hereinafter set out. In FIGURE 1, it is noted that the linkages 46 and 62 are angularly directed towards each other in a rearward direction as illustrated when the load arms 14 are in the lowermost position or material engaging position.

A pair of hydraulic cylinders 70 are pivotally connected to the posts 50 by pins 72 and to load arms 14 by pins 74. Hydraulic member 70 may be located with the pivots 72 and 74 at various other positions on the vehicle V and load arms 14, for purposes of the best mechanical advantage, the pivot 72 should be located somewhere in the vicinity of a vertical line extending between the pivots 48 and the pivots 66 and in close proximity thereto. The present design permits the hydraulic members 70 to be located within the tubular or channel structure of the arms 14. This permits a more compact working arrangement. It is obvious that some other type of power mechanism may be used and that hydraulic lines (not shown) would be connected to suitable power operating mechanism within the cab of the vehicle V or the like.

*Operation*

FIGURE 4 illustrates the various positions of the bucket 16 during the operation from a bottom load carrying position to a raised top and dumping position. When the bucket 16 shown in FIGURE 1 in the material handling position, is tilted to the material supporting position by means of the hydraulic cylinder 20 which retracts as illustrated in FIGURE 4, the load will be positioned for raising to the next dotted line position from the bottom as illustrated in FIGURE 4 for a road travelling position when the hydraulic cylinder 70 is expanded. Further expansion of the cylinder 70 will raise the load arms and the bucket 16 to the upper load carrying position and thence to the highest position for dumping as illustrated in FIGURE 4. It is to be noted in the dash dot line A, that the travel of the bucket 16 is substantially in a vertical straight line direction. It is also to be noted that links 46 which were positioned originally above the arms 14 when in working position, are located below the arms 14 as illustrated in FIGURE 4 when in dumping position. At all times, links 62 maintain their position below arms 14.

As has been pointed out above, slight variations in the pivot points and in the linkages will provide changes in the direction of travel of the bucket 16. The height of the pivot 48 above the pivot 66 is also a factor in changing the direction of travel of the bucket 16. For maximum lift, the distance between the pivot 48 and the pivot 66 should approximate the length of the hydraulic cylinder 70 when collapsed. Link 46 should be longer than the distance between pivots 48 and 66 and link 62 should be longer than the link 46. The distance between pivots 44 and 60 should be approximately half of the distance between pivots 44 and 48 in order to provide the operating relationship as illustrated in FIGURE 4.

It will be also noted that the approximate midsection of said load arms is positioned substantially at all times in vertical alignment with said pivotal connections. It will also be noted that stationary pivots 48 and 72 will at all times during operation be in advance of movable pivots 44 and 60.

While the invention has been thus described, it will be understood that it is capable of further modifications and this application is intended to cover any variations, uses, or adaptations of the invention following in general, the principles of the invention and including such departures from the present disclosure as come within knowledge or customary practice in the art to which the invention pertains, and as may be applied to the essential features hereinbefore set forth and as fall within the scope of the invention or the limits of the appended claims.

Having thus described my invention what I claim is:

1. A material handling apparatus for attachment to a tractor having a frame including an upper support structure and a lower support structure comprising:
   (a) a pair of load arms
   (b) said load arms supporting at their forward end a material handling member
   (c) each of said load arms having connected at its rear end a downwardly projecting member
   (d) each of said downwardly projecting members having one end lower than its other end at all times during operation of said apparatus
   (e) each of said downwardly projecting members having pivotally connected to said lower end a first link extending forwardly thereof for pivotal connection to said lower support structure
   (f) each of said load arms having pivotally connected in the vicinity of said rear end of said arms a second link extending forwardly thereof for pivotal connection to said upper support structure
   (g) said first links being positioned at all times below said load arms during operations of said apparatus
   (h) said second links being positioned above said load arms when said material handling member is in load position and below said load arms when said material handling member is in unload position
   (i) and means on said frame connected to said material handling apparatus for vertically raising and lowering said load arms and for loading and unloading said material handling member.

2. A material handling apparatus as in claim 1 and wherein
   (a) each of said load arms and said downwardly projecting members are integral.

3. A material handling apparatus as in claim 2 and wherein
   (a) said downwardly projecting members angularly project rearwardly.

4. A material handling apparatus as in claim 3 and wherein
   (a) said load arms including said downwardly projecting members each form a "C" shape.

5. A material handling apparatus as in claim 1 and wherein
   (a) said pivotal connections to said support structure are in vertically aligned pairs and are in advance of said link pivots.

6. A material handling apparatus as in claim 1 and wherein
   (a) said vertical raising and lowering means is pivotally connected in the vicinity of said rear end of said arms.

7. A material handling apparatus as in claim 6 and wherein
   (a) said pivotal connections to said support structure are in vertically aligned pairs and are in advance of said link pivots, and
   (b) said vertical raising and lowering means is also pivotally connected between said vertically aligned pivot connections.

8. A material handling apparatus as in claim 1 and
   (a) including said tractor,
   (b) said tractor having a support positioned centrally of said frame including said upper support and lower support structures,
   (c) said pivotal connections to said support structures being in vertical alignment in said central support and in advance of said link pivots.

9. A vertical handling apparatus as in claim 8 and wherein
   (a) the approximate midsection of said load arms is positioned substantially at all times in vertical alignment with said pivotal connections.

10. A material handling apparatus as in claim 1 and wherein
    (a) said first links are longer than said second links.

11. A material handling apparatus as in claim 10 and wherein
    (a) said downwardly projecting members are shorter than said first and second links.

12. A material handling apparatus as in claim 11 and wherein
    (a) said downwardly projecting members are interconnected at their lower ends.

13. A material handling apparatus as in claim 11 and having
    (a) a horizontal cross bar member connecting said downwardly projecting members at their lower ends.

14. A material handling apparatus as in claim 13 and wherein
   (a) said first and second links each form a pair of links the forward ends of which are spaced at all times farther away from each other than the rearward ends so as to angle towards each other in a rearward direction.

15. A material handling apparatus as in claim 14 and wherein
   (a) said apparatus has only a slight shift forward, in its center of gravity as said material handling member is raised.

16. A material handling apparatus as in claim 1 and wherein
   (a) the distance between the pivotal connections of said first and second links to said support structures is less than the lengths of said links.

17. A material handling apparatus as in claim 1 and wherein
   (a) the distance between the pivot on the lower end of said downwardly projecting members and the pivot in the vicinity of the rear end of said load arms, is approximately one half the distance between the pivots of said first link.

18. A material handling apparatus as in claim 1 and wherein
   (a) said downwardly projecting member is shorter than said first link,
   (b) the distance between said pivotal connections of said first and second links to said support structure is shorter than said first link and longer than said downwardly projecting member, and
   (c) said first link is shorter than said second link.

19. A material handling apparatus as in claim 1 and wherein
   (a) said means for raising and lowering said load arm is nested substantially within said load arms when in load position.

20. A material handling apparatus as in claim 1, and wherein
   (a) said first and second link support structure pivots are stationary,
   (b) said first and second link downwardly projecting pivots are movable, and
   (c) said stationary pivots are at all times during operation in advance of said movable pivots.

References Cited by the Examiner
UNITED STATES PATENTS 2,980,271   4/61   Ulinski _____ 214—140
3,024,927   3/62   Quayle _____ 214—131

HUGO O. SCHULZ, *Primary Examiner.*